United States Patent Office 3,075,934
Patented Jan. 29, 1963

3,075,934
PROCESS FOR PREPARING AQUEOUS SLURRIES OF ACRYLONITRILE POLYMER AND RESULTING PRODUCT
Lester David Grandine, Jr., Wilmington, Del., and William Kenneth Wilkinson, Waynesboro, Va., assignors to E. I. du Pont de Nemours and Company, Wilmington, Del., a corporation of Delaware
No Drawing. Filed Nov. 4, 1957, Ser. No. 694,082
13 Claims. (Cl. 260—29.6)

This invention is concerned with a new process for preparing polymers of acrylonitrile.

In one known procedure for preparing polymers of acrylonitrile, the polymerization is conducted in an aqueous medium. The polymer is recovered from the reaction product mixture by filtration and then washed and dried. Spinning solutions may be prepared by dissolving the dried polymer in a solvent.

This procedure is expensive because the steps of polymer recovery, washing, drying, storage and solution preparation are laborious and time-consuming and require costly machinery. In addition, special care must be taken to prevent deterioration of polymer properties, such as color or solubility. A process which permitted utilization of an acrylonitrile polymerization reaction product mixture directly (without isolation of polymer) in preparation of a spinning solution would be extremely advantageous.

It has been proposed in U.S. 2,528,710 to batch polymerize acrylonitrile in a solvent for the polymer such as dimethylformamide using a $BF_3$:DMF complex as a catalyst. Such polymerizations have the commercial disadvantages of having a rather low productivity (0.3 to 2.5% solids per hour in the product) and of gelling at conversions as low as 6%. This premature gelling renders control of the polymerization extremely difficult and makes necessary the use of expensive batch processing.

It has also been proposed in U.S. 2,768,148 to batch polymerize a 5–90% solution of acrylonitrile in an aliphatic cyclic carbonate or a lactone and to use the reaction product mixture either directly or with purification as a spinning solution. However, such a polymerization has relatively low productivity (2.5 to 3.8% solids per hour) and gels at rather low conversions. This patent discloses that attempts to use dimethylformamide in a similar polymerization produced orange or brown colored solutions of polymers whose viscosity was too low to give textile materials of good properties.

U.S. 2,425,192 discloses a batch polymerization of acrylonitrile in a hydrotropic salt solution such as $ZnCl_2$. Such polymerizations are typically slow and produce gels. Moreover, the reaction product mixture cannot be used directly in dry spinning.

Other prior art processes have involved batch polymerization of acrylonitrile in various media, but such polymerizations have been characterized by low productivity and such low solids content as to be unfeasible for preparation of spinning solutions directly from the reaction product mixture.

An object of this invention is to provide a process for preparing polymers of acrylonitrile (including copolymers containing at least 85% combined acrylonitrile) at commercially acceptable rates of conversion so as to provide a reaction product mixture having high solids content, and yet having sufficient fluidity to be handled in a continuous manner for the preparation of a spinning or casting solution directly from the slurry (without intermediate isolation of the polymer).

Conventional initiating systems, for example, potassium persulfate, or ammonium persulfate with sodium bisulfite or sodium thiosulfate in a polymerization from which only volatile materials are removed before spinning, causes the final spinning solution or casting solution to be quite hazy. Such hazy solutions lead to spinning difficulties in that they tend to plug the spinneret orifices or spinneret filtration packs and cause non-uniformities in the yarn. Other initiator systems such as, for example, $SO_2$ and benzoyl peroxide, also present problems since the usual neutralization with an inorganic base (required to reduce corrosion) leads to hazy spinning solutions.

The above-mentioned problems are amplified greatly when one attempts to prepare copolymers of acrylonitrile for the purpose of improving dyeability. Inclusion in a polymer containing 85% or more of acrylonitrile of 40–90 milliequivalents of combined sulfur as sulfonic or sulfuric ionizable groups per kilogram of polymer provides good basic dyeability. Good dyeability with basic dyes is shown by copolymers of acrylonitrile containing from about 0.4% to 3% of combined sulfonic acid or its salt.

Copolymers of acrylonitrile having improved dyeability are prepared by copolymerizing acrylonitrile and a sulfonated monomer, as shown by U.S. 2,601,256 to Bruson and U.S. 2,527,300 to Dudley, the sulfonated monomer usually being in the form of an alkali metal or ammonium salt of a sulfonic acid. The presence of such alkali metal or ammonium cations in an acrylonitrile spinning solution causes hazy solutions and poor processing continuity in the spinning operation. An obvious expedient is to use the free sulfonic acid, but this makes the control of the polymerization difficult, may cause corrosion in the polymerization reactor and affords too corrosive a mixture for the preparation of a spinning solution by distillation and the extrusion of that solution.

It is a further object of this invention, therefore, to provide a process whereby monomers comprising at least 85% acrylonitrile are copolymerized by addition, and the resulting polymerization product is directly convertable (without prior isolation of the polymer) to a spinning or casting solution substantially free from color or haze.

Another object of this invention is to provide a process whereby a mixture of monomers containing at least 85% acrylonitrile, a monomer containing an acidic group and optionally one or more other monomers is copolymerized and the polymerization reaction product mixture is directly converted to a spinning or casting solution substantially free from haze or color by distillation.

A further object of this invention is to provide a process whereby a mixture of monomers comprising at least 85% acrylonitrile, a sulfonated monomer, and optionally one or more other monomers is copolymerized and the polymerization product is directly converted to a spinning or casting solution of improved quality.

The objects of this invention are attained by copolymerizing a monomer mixture comprising an acidic monomer in the form of an organic amine salt and containing at least 85% acrylonitrile in a media comprising a solvent for the polymer produced. The polymerization reaction product mixture is converted to a spinning or casting solution by distillation to remove unreacted monomers.

Organic amines useful for preparing the organic amine salts of acidic monomers used in the process of this invention are characterized by the structural formula

where R is an alkyl or aryl group and $R_1$ is hydrogen or alkyl and $R_2$ is an alkyl group. R, $R_1$, and $R_2$ may be the same or different. When any of R, $R_1$, or $R_2$ is an alkyl or aryl group, it is preferred that the group contain less than about eight carbon atoms. Trialkyl amines in which each of the alkyl groups contains less than four carbon atoms are preferred as producing the most desirable polymeric product with greatest facility. Where convenience and expense are not important, the organic amines may contain larger alkyl and aryl groups. It is essential that the organic amine be soluble in the polymer solvent utilized.

Representative organic amines useful in the process of this invention include secondary amines such as dimethyl amine, diethyl amine, dipropyl amine, di-n-butyl amine, diisobutyl amine, methyl ethyl amine, methyl propyl amine, ethyl propyl amine, etc. Tertiary amines which are useful include trimethyl amine, triethyl amine, tripropyl amine, tributyl amine, methyl diethyl amine, methyl ethyl propyl amine, and the like. Similarly, phenyl dimethyl amine, etc., may be used as well as bis(hydroxyethyl)amine and hydroxyethyl dimethyl amine. Secondary and tertiary amines in which one or more alkyl or aryl groups carries a non-hydrocarbon constituent may be used so long as the latter constituent does not react with other reactants in the polymerization, for example, cyanoethyl butyl amine and similar compounds.

In accordance with this invention, acrylonitrile is polymerized with an acidic monomer in the form of an organic amine salt formed by reaction of the acidic monomer with one or more of the above-mentioned organic amines. The polymerization is conducted in the absence of metal ions and inorganic ammonium ions ($NH_4^+$).

Acrylonitrile is present in the polymerization reaction mixture in an amount of at least 85% based upon the total monomer mixture which may include, in addition to an acidic monomer, one or more other monomers capable of copolymerizing with acrylonitrile in a free-radical initiated system. The acidic monomer utilized may be any acidic monomer capable of copolymerizing with acrylonitrile such as carboxylic acid vinyl monomers, for example, acrylic acid, fumaric acid, itaconic acid, alpha-chloro-acrylic acid, methacrylic aid, and the like, as well as phosphonic acids, for example, 1-propene-2-phosphonic acid. Sulfonic acid monomers such as allysulfonic acid and ethylene sulfonic acid are preferred, and other sulfonic acids such as sulfoarylethylene acids, methallyl sulfonic acid, methallyldisulfonic acid are very desirable, also. Other acid monomers are disclosed in U.S. 2,601,256 to Bruson and U.S. 2,527,300 to Dudley. Sulfuric acid monomers are preferred because they form copolymers with acrylonitrile which are exceptionally stable with respect to discoloration in the presence of heat.

Acidic monomers are utilized in amounts of about 0.1% to about 15% (measured as free acid) of the total monomeric weight and preferably from 0.1% to about 8%, the exact quantity depending upon the molecular weight and number of sulfonic acid groups present.

When the acidic monomer used in the process of this invention is an unsaturated sulfonic acid, it is preferred that the sulfonic acid be utilized in the form of an amine salt due to the surprisingly greater utilization of those monomers in the final copolymer when used in that form. However, the advantages of a superior spinning solution having greater clarity and greater filterability can also be obtained if the free acids are used in the polymerization and are converted to the amine salts before the polymerization product is converted to a spinning solution. In this case, the appropriate amount of the amine can be added to the polymerization product. Since such redox polymerizations are usually conducted at a pH of 2.5 to 6, complete neutralization of the product with an amine is preferred to cause the least amount of corrosion in subsequent steps even when an amine salt of a monomer is used in the monomer mixture.

The neutralization of an acidic polymer product by an amine according to this invention is of great advantage when polymerizing acrylonitrile and neutral monomers. For example, if the product of polymerizing acrylonitrile and methyl acrylate in dimethylformamide with benzoyl peroxide and $SO_2$ is neutralized with $Na_2CO_3$ to lower corrosion, the spinning solution obtained therefrom is quite hazy. Neutralization with triethylamine affords clear solutions.

Although dimethylformamide is a preferred polymer solvent in this invention, dimethylacetamide and N-methyl pyrrolidone are also applicable in this process, as well as other solvents for the polymer, such as dimethyl sulfoxide and tetramethylene sulfone. Dimethylformamide, dimethylacetamide and N-methyl pyrrolidone are preferred because polymer slurries in these solvents are very readily converted into solutions suitable for dry spinning.

Any suitable polymerization initiation system can be used that is soluble in the reaction mixture. Systems should preferably be selected that are sufficiently active at temperatures below 80° C. in order to obtain a high productivity (7% or greater), a satisfactory molecular weight ([N] of 1.0 or greater preferably), slurries of low consistency (less than 50 poises), and fibers of good color.

Peroxides of the structure RCO—OO—COCR where R is alkyl or aryl (i.e., diacyl or diaroyl peroxides) are especially suitable as initiators in the process of this invention. They may be thermally decomposed, but for the sake of easier control (less temperature sensitive) and better color (lower possible polymerization temperatures), a redox system is preferred. The redox combinations of such a peroxide with $SO_2$ and an oxidizable heavy metal ion such as $Fe^{++}$ or an N,N'-dialkyl aniline ion are especially useful. (Salts of perdisulfuric acid are useful in a redox system.)

Organic azo compounds as disclosed in U.S. Patent 2,471,959 wherein the azo, —N=N—, group is acylic and bonded from both of the nitrogens to carbons which are aliphatic in character and at least 1 of which carbons is tertiary, are useful in this process.

Although initiators can be thermally decomposed to start polymerizations, an activated decomposition that is less subject to the restricted temperature control of thermal initiation is preferred in this invention. An activator system comprising an oxidizable oxygen-containing sulfur compound such as $SO_2$, and an oxidizable ion of a heavy metal, such as iron, manganese, lead, cobalt, or chromium at a pH of 2.2 to 4.5 is very satisfactory. An activator system preferred to the above is obtained by replacing the heavy metal ion with an N,N-dialkyl aniline, such as dimethyl aniline or diethyl aniline, and using a reducing acid such as $SO_2$, $H_3PO_2$, $NaHSO_3$, benzene phosphinic acid, $NaOSOCH_2OH$ or $Zn(OSOCH_2OH)_2$ to adjust the pH at about 3 to 6.5. This affords a whiter color polymer and the productivity and inherent viscosity are less sensitive to pH.

The polymerization reaction of this invention is advantageous in permitting rapid production of acrylonitrile polymers at molecular weights satisfactory for good fiber formation. Moreover, these polymers are obtained in the form of reaction product mixtures having compositions and consistencies such that these mixtures can be directly converted into solutions that are suitable for spinning without the expensive and product-deteriorating steps of polymer separation, washing, drying, and solution preparation.

The polymerization products of this invention may be converted directly to spinning or casting solutions by distilling off unreacted monomer and diluent or by replacing the unreacted monomer or diluent with polymer solvent in a stripping column. It may be desirable to dilute the polymerization product with polymer solvent before doing this. If the polymer slurry (diluted or not) is to be concentrated in a stripping column, it should preferably contain no more than 10% water because of operating difficulties of the stripping column. Higher amounts of water are also undesirable due to the excessive dilution (by the solvent) that occurs in a stripping column as a result of the high heat of vaporization of water compared to the solvent (with DMF approximately 4:1).

Even when using the preferred polymerization reaction mixture of this invention, a sharp increase in polymer slurry viscosity can occur after about 1 to 2 complete turnovers of the reactor volume. The time required to fill the reactor or cause a turnover of the volume is known as the holdup time. Such an increase in viscosity can be so great that stirring the slurry is impossible and the polymerization runs out of control. However, by approaching or reaching equilibrium or steady state conditions at a lower level of solids than that ultimately desired and then increasing the solids content, a continuous system can be handled without the occurrence of an uncontrollable viscosity. According to one method, catalyst is added to the reaction at about 10% to 80% of the ultimately desired feed rate for a time required to replace the reactor volume three times, then the catalyst feed is increased to the level desired for steady state conditions. The reaction product slurry is discarded until approximate steady state conditions are obtained (three turnovers of the reactor volume afford conditions within 10% of equilibrium).

Alternatively, the polymerization can be started using the feed rates finally desired but maintaining the temperature about 10° C. below the ultimately desired temperature. After three reactor turnovers, the temperature is raised and three additional reactor turnovers are discarded before steady state conditions are approximately reached and the desired polymer slurry collected. Another method is to use a reduced holdup period for several reactor turnovers and then increase the holdup time to the desired level.

Since the above methods always require more time and involve a certain waste, the following method is preferred since it is only applied when a viscosity maximum starts to occur. The polymerization reaction is started with all conditions as desired for the final steady state conditions. If the polymer slurry thickens to a viscosity greater than 300 centipoises, the flow of the polymer solvent solution of the activator is increased about 100%. This combination of high solvent level and high activator level is continued for 15 minutes and then reduced to the original levels. The polymer slurry is discarded for three reactor turnovers of the reactor volume before polymer is collected.

In the absence of the novel polymerization conditions of this invention, such start-up techniques by themselves do not permit the continuous production of polymer slurries of high solids content and low viscosity which can be used directly in the preparation of spinning solutions. Such an approach is, of course, no value in batch polymerization.

When other variables are kept constant, the degree of conversion is proportional to the hold-up time in the reactor.

This invention is particularly concerned with a polymerization process in which the reaction product mixture can be directly converted by distillation to a homogeneous solution satisfactory for spinning or casting. The total monomer content in such a polymerization reaction wil comprise from 24½% to 75% of the total weight of the polymerization reaction mixture with the range of 40% to 75% preferred. A solvent for the polymer is present in an amount of from 17.5% to 70% of the total reaction mixture. The solvent may be undiluted, or a nonsolvent for the polymer (preferably water) may be used as a diluent in the amount of 0 to 20% of the total reaction mixture. A mixture of a solvent for the polymer produced and 4% to 20% water based on the weight of total polymerization reaction mixture is preferred as against pure solvent due to the higher productivity and higher molecular weight of the polymer obtained at a given initiator level. Also, at solvent/diluent ratios of 40/60 or less and at certain monomer concentrations a 3-phase system with the monomer occurs which causes the formation of hard, grainy particles of polymer that are unsuitable for processing. The presence of water is also preferred to obtain a better solution of certain comonomers. Although the polymerization can be conducted in a batch manner, a continuous polymerization— known as constant environment polymerization—is preferred for purposes of commercial productivity and uniformity of the polymer.

In the following examples all proportions and percentages are by weight unless otherwise noted. The percentages of all ingredients of the initiating systems are based on the total monomer feed (BOM).

EXAMPLE I

A 10–20% aqueous solution of potassium ethylene sulfonate is converted into the free acid by passing through an acidic ion-exchange resin. The acid solution is neutralized with triethylamine to pH 5.8 to obtain the triethylammonium salt of ethylene sulfonic acid.

A mixture of acrylonitrile/methyl acrylate (93%/7%), 55 parts; dimethylformamide/water (85%/15%), 45 parts; triethylammonium ethylene sulfonate—calculated as the acid—0.45% based on monomers; benzoyl peroxide, 0.20% based on monomers; triethylamine, 0.07% based on monomers; sulfur dioxide, 0.13% based on monomers; and ferrous ion (in the form of ferrous ammonium sulfate), 10 p.p.m. based on monomers are continuously added through appropriate metering devices to a water-jacketed, stirred aluminum reactor under a blanket of nitrogen gas at such a rate that the contents of the reactor are completely replaced every 100 minutes. The amine, sulfur dioxide, and a portion of the dimethylformamide are fed through a common tube. The temperature is maintained at 55° C. and reaction product slurry containing polymer, unreacted monomer and dimethylformamide and water are continuously caught and shortstopped against further polymerization by the addition of 0.06% thiourea monomer and 0.20% triethylamine, both based on the monomers. The amine renders the slurry non-corrosive to iron. Timed samples of this polymer slurry are collected, and the polymer completely precipitated, washed and dried. Conversion is 49%, and intrinsic viscosity of the polymer is 1.3.

The resulting copolymer contains 0.49% ethylene sulfonic acid units, correction being made for acidic end groups derived from sulfur dioxide. The ratio of acidic monomer units in the polymer to the acidic monomer in the feed, herein termed "relative utilization," is 1.1.

The product of the polymerization, a slurry of polymer with a viscosity of about 1 to 10 poises, is converted into a solution suitable for spinning by diluting with DMF to about 17% solids concentration, evaporation of the excess (unreacted) monomers, water and DMF under a vacuum of 100 mm. mercury pressure (absolute) until a solution of 25–30% solids is formed. The resulting clear solution at 110° C. is extruded through a spinneret containing 5 orifices (each 0.0065 inch in diameter) into an inert gas at 190° C. and the yarn wound up at 100 yards per minute. After extracting the residual DMF from the yarn with water at 100° C., the yarn is drawn to 4 times its original length in 95° C. water. The resulting yarn is strong, has an excellent white color, and can be dyed to deep, fast shades with basic dyes, such as Brilliant Green (Color Index 662) and Crystal Violet (Color Index 681).

The above polymerization is repeated with sodium ethylene sulfonate in place of the triethylammonium salt. A 45% conversion is obtained. The polymer has an intrinsic viscosity (N) of 1.45 and contains 0.32% ethylene sulfonic acid units. Thus, a relative utilization of 0.7 with the sulfonated monomer is obtained. The polymerization slurry is converted into a spinning solution as above but the final solution is very hazy and almost opaque.

A similar polymerization is carried out with the substitution of the zinc salt of ethylene sulfonic acid for the triethylammonium salt. A conversion of 41% is obtained. The polymer has an intrinsic viscosity of 1.59 and contains .40% ethylene sulfonic acid units. Thus, a relative utilization of .88 with the sulfonated monomer is obtained. The polymer slurry is converted as above to a solution suitable for spinning. The final solution is somewhat hazy.

Spinning continuity, in terms of filter pack life and spinneret life, can be correlated with the filter-ability of spinning solutions as measured under constant pressure. In the aquation $$K = \frac{1}{G} - \frac{1}{S_0 t}$$

G is the weight in grams of a solution which has passed through the filter in $t$ seconds, $S_0$ is initial rate of throughput, and K is the filterability value. A plot of $1/G$ vs. $1/t$ gives K (filterability) as the intercept on the $1/G$ axis.

In determining the relative filterability of polymer spinning solutions prepared in accordance with this invention, several solutions prepared from the above polymerization reaction product mixture are filtered at 100° C. under a pressure of 100 p.s.i. through a calibrated filter paper supported by a 200 mesh screen, a perforated steel plate and a 20 mesh screen, in that order. Filter papers designed for fine precipitates such as #589 Black Ribbon made by Carl Schleicher & Schuell Co. of Keene, New Hampshire, are satisfactory. Only those papers that pass 400 ml. of acetone (under its own pressure) through a 3.5 cm. diameter section in 51±3 seconds are used.

Examination of a number of solutions prepared from the above polymerization reactions gives the following results. Solutions with K values above 20 afford poor spinning performance.

Table I

| Salt of Sulfonated Monomer Used | Polymer Solution Properties | | |
|---|---|---|---|
| | Percent Solids | Clarity | K |
| Sodium | 22.7 | Cloudy | >50 |
| Do | 27.5 | do | >50 |
| Do | 26.2 | do | >50 |
| Zinc | 26.0 | Nearly Clear | 17 |
| Do | 23.0 | Cloudy | 4 |
| Triethylammonium | 25.9 | Clear | 7 |
| Do | 23.8 | do | 10 |
| Do | 28.0 | do | 8 |
| Do | 26.8 | do | 15 |

The advantage of using the triethylammonium salt as contrasted with the sodium salt in obtaining a clear solution that is readily filtered and spun is evident from the above data.

Another property of a spinning solution which is of great importance is the length of time that the solution can be heated before gelation occurs. In this example, spinning solutions are maintained at 125° C. and the viscosity determined by a falling ball method until such time (known as gel time) as an abrupt increase in viscosity to ten times the initial value indicates the incipient gelation. Gel times are determined on solutions prepared as above wtih the following results.

Table II

| Salt of Sulfonated Monomer Used | Polymer Solution Properties | |
|---|---|---|
| | Percent Solids | 125° C. Gel Time (Hrs.) |
| Zinc | 24.5 | 2 |
| Do | 26.1 | 2 |
| Do | 26.0 | 42 |
| Triethylammonium | 26.0 | 42 |
| Do | 28.0 | 38 |
| Do | 30.6 | 38 |
| Sodium | 27.0 | 40 |

Table II indicates that polymers containing the zinc salt, although occasionally furnishing clear solutions of acceptable filterability, are unsatisfactory from the point of view of permitting a spinning solution to be retained in a spinning system without gelling and disrupting spinning continuity. Although identical solid contents of the solutions have not been compared, it is known from past experience that the higher the percent of solids in the solution, the shorter the gel time so that the polymer slurries prepared using a triethylammonium salt are definitely superior and give satisfactory spinning solutions.

EXAMPLE II

A mixture of acrylonitrile and methyl acrylate 94/6% by weight is copolymerized with ethylene sulfonic acid in a mixture of dimethylformamide and water 90/10 parts by weight with benzoyl peroxide and 0.25% $SO_2$ based on the total weight of methyl acrylate and acrylonitrile at a temperature of 55° C. in a continuous manner in Example I.

In various runs, an amount of dimethyl amine, trimethyl amine, or triethyl amine is continuously added to the reaction in the same feed line with the $SO_2$ and a portion of the DMF in an amount in excess of that required to neutralize the sulfonic acid so that this monomer exists in the solution as an amine salt. The results of the various polymerizations are shown as runs $a$ through $d$ in Table III.

Table III

| Run | Acidic Monomer | Percent[1] | Amine | Percent[1] | Benzoyl Peroxide,[1] percent | Conversion, percent | [N] | Milliequivalents, Acid/Kg. | Hold-up Time (min.) |
|---|---|---|---|---|---|---|---|---|---|
| a | ethylene sulfonic acid | 0.33 | $(CH_3)_2NH$ | 0.17 | 0.20 | 51 | 1.47 | 48 | 105 |
| b | do | 0.34 | $(CH_3)_3N$ | 0.23 | 0.20 | 30 | 1.68 | 58 | 70 |
| c | do | 0.31 | $(C_2H_5)_3N$ | 0.32 | 0.20 | 41 | 1.60 | | 70 |
| d | sodium ethylene sulfonate | 0.40 (.33 as acid) | none | | 0.05 | 29–36 | 2.10 | 40 | 120 |
| e | allyl sulfonic acid | 0.34 | $(CH_3)_2NH$ | 0.20 | 0.20 | 48 | 1.84 | 53 | 105 |
| f | do | 0.40 | $(CH_3)_3N$ | 0.22 | 0.30 | 36 | 1.61 | 62 | 70 |
| g | do | 0.40 | $(C_2H_5)_3N$ | 0.37 | 0.30 | 38 | 1.49 | | 70 |
| h | sodium allyl sulfonate | 0.60 (0.51 as acid) | none | | 0.1 | 49 | 1.79 | 40 | 153 |

[1] Based on total weight of acrylonitrile and methyl acrylate.

In runs c, d, and h acrylonitrile plus methyl acrylate made up 55% of total feed, in all other runs these monomers made up 60% of total feed. In runs c, d, and h, 10 p.p.m. Fe++ ion was present, whereas other runs contained 0.1— diethyl aniline based on monomers. Run e was polymerized at 65° C., all other runs were conducted at 55° C. Runs c, d, and h had a DMF/water ratio of 85/15; all other runs had a DMF/water ratio of 90/10.

It will be noted that the polymerizations containing the amine salts of the sulfonic acid are completely satisfactory with respect to conversions and (N) of the polymer obtained. For a given percent of acidic monomer in the reactor feed, the use of amine salts results in a greater acidic modification of the polymer by the sulfonic acid as shown in the milliequivalents of acid, per kilogram of polymer.

To a sample of each of the slurries of the runs a through d in Table III, sufficient dimethylformamide is added to give a 17% solid slurry. Thiourea (0.3% based on the weight of acrylonitrile, methyl acrylate in the feed) is added and the slurry converted to a spinning solution in a resin kettle by distilling at a pressure of about 100 mm. of mercury (absolute) by water bath heat while stirring until a calculated volume of liquid, consisting of all the water and unreacted acrylonitrile and some dimethylformamide, is removed to give a 27% solution of polymer. The spinning solution made from run d is very hazy (almost opaque), whereas that made from polymer from runs a, b, and c is clear.

EXAMPLE III

The polymerizations of Example II are repeated with the substitution of allyl sulfonic acid for the ethylene sulfonic acid. The results are shown in Table III as runs e through h. The sodium salt of allyl sulfonic acid results in a much lower utilization of this monomer in the final terpolymer than when the sulfonic acid is used in the form of an amine salt.

Spinning solutions prepared by distillation from polymer slurries in runs e, f, and g are perfectly clear, whereas the spinning solution obtained from run h at similar solids content is very hazy.

EXAMPLE IV

This example shows the increased utilization of ethylene sulfonic acid when copolymerized in the form of its amine salts.

A series of polymerizations similar to those shown in Example I are conducted, ethylene sulfonic acid being used in the form of free acid, triethylammonium salt, sodium salt, and as the zinc salt. The resulting polymers are analyzed for sulfonate content. The averages of at least 4 runs in each case are shown in Table IV. "Relative utilization" is the sulfonic acid content of polymer divided by the sulfonic acid content of the total monomer feed.

*Table IV*

| Sulfonated monomer used: | Relative utilization |
|---|---|
| Hydrogen ethylene sulfonate | 0.70 |
| Sodium ethylene sulfonate | 0.70 |
| Zinc ethylene sulfonate | 0.88 |
| Triethylammonium ethylene sulfonate | 1.00 |

The expression inherent viscosity, $[N]_h$, as used in the examples, is defined as $$\frac{\ln Nr}{c}$$

wherein $c$ is the concentration of the polymer in 100 ml. of the solvent and $Nr$ is the symbol for relative viscosity, which is the ratio of the flow time of the polymer solution relative to the flow time of the solvent. The viscosity measurements were made on ½% solutions of the polymer in DMF at 25° C.

In some examples, the expression "intrinsic viscosity" $[N]$ is used and is defined as:

$$\text{Limit} \left[\frac{\ln Nr}{c}\right]_{c \to 0}$$

Although it is desirable that the polymerization reaction mixtures and resulting polymer slurries of this invention be completely free of alkali metal and inorganic ammonium ions, a very small amount of one or more of these ions may be present without adverse effect. Thus, it will be noted in certain of the examples that ferrous ions are used in the form of ferrous ammonium sulfate, thereby imparting a small amount of ammonium ions to the reaction mixture. However, the quantity of ammonium ions is usually of the order of about 10 parts per million and, so long as the quantity of metal and ammonium ions in the polymerization reaction mixture or the polymer slurry does not exceed 0.01% by weight of the total composition, the advantages of this invention are obtained.

The claimed invention:

1. A slurry of an acrylonitrile polymer containing at least 85% by weight combined acrylonitrile and from 0.1% to 15% by weight of a copolymerizable acidic component selected from the group consisting of ethylenically unsaturated carboxylic, phosphonic, and sulfonic acids copolymerizable with acrylonitrile, said acidic component being present in the form of a salt of an organic amine wherein said amine has a maximum of one hydrogen attached to the nitrogen of the amine group, between about 17.5% and about 70% by weight of said slurry being an organic solvent for said polymer, said slurry containing between about 4% and about 20% by weight of water and less than about 0.01% by weight of metal and inorganic ammonium ions.

2. The slurry of claim 1 in which the organic solvent is dimethylformamide.

3. The slurry of claim 1 in which the amine salt is a tertiary amine salt.

4. The slurry of claim 3 in which the organic solvent is dimethylformamide.

5. The slurry of claim 1 in which the amine salt is a secondary amine salt.

6. A process for preparing an acrylonitrile polymer slurry which comprises reacting in the presence of a polymerization initiation system and an organic solvent for the acrylonitrile polymer a mixture of copolymerizable monomeric materials comprising at least 85% by weight acrylonitrile and from about 0.1% to about 15% by weight of an acidic monomer selected from the group consisting of ethylenically unsaturated carboxylic, phosphonic, and sulfonic acids copolymerizable with acrylonitrile, said acidic monomer being present in the form of a salt of an organic amine wherein said amine has a maximum of one hydrogen attached to the nitrogen of the amine group, said organic solvent being present in an amount between about 17.5% and about 70% based on the total weight of the reaction mixture, said reaction mixture containing between about 4% and about 20% by weight of water and less than about 0.01% by weight of metal and inorganic ammonium ions.

7. The process of claim 6 wherein said process is a continuous process.

8. The process of claim 7 in which the organic solvent is dimethylformamide.

9. The process of claim 7 in which the amine salt is a tertiary amine salt.

10. A process for preparing an acrylonitrile polymer slurry which comprises reacting in the presence of a polymerization initiation system and an organic solvent for the acrylonitrile polymer a mixture of copolymerizable monomeric materials comprising at least 85% by weight acrylonitrile and from about 0.1% to about 15% by weight of an ethylenically unsaturated sulfonic acid copolymerizable with acrylonitrile, said ethylenically unsaturated sulfonic acid being present in the form of a salt of an organic amine wherein said amine has a maximum of one hydrogen attached to the nitrogen of the amine group, said organic solvent being present in an amount between about 17.5% and about 70% based on the total weight of the reaction mixture, said reaction mixture containing less than about 0.01% by weight of metal and inorganic ammonium ions, and between about 4% and about 20% by weight of water.

11. The process of claim 10 in which the amine salt is triethylammonium allylsulfonate.

12. The process of claim 10 in which the amine salt is triethylammonium ethylene sulfonate.

13. A process for preparing an acrylonitrile polymer slurry which comprises continuously polymerizing in the presence of a polymerization initiation system and an organic solvent for the acrylonitrile polymer a mixture of copolymerizable monomeric materials comprising at least 90% by weight acrylonitrile, from about 0.1% to about 8% by weight of an ethylenically unsaturated sulfonic acid copolymerizable with acrylonitrile, said ethylenically unsaturated sulfonic acid being present in the form of a salt of an organic amine wherein said amine has a maximum of one hydrogen attached to the nitrogen of the amine group, the remainer of said copolymerizable monomeric materials being methyl acrylate, said organic solvent being present in an amount between about 17.5% and about 70% based on the total weight of the reaction mixture, said reaction mixture containing less than about 0.01% by weight of metal and inorganic ammonium ions, and between about 4% and about 20% by weight of water.

References Cited in the file of this patent

UNITED STATES PATENTS

| | | |
|---|---|---|
| 2,404,713 | Houtz | July 23, 1946 |
| 2,436,926 | Jacobson | Mar. 2, 1948 |
| 2,732,358 | Jones | Jan. 24, 1956 |
| 2,773,856 | Meyer et al. | Dec. 11, 1956 |
| 2,858,290 | Davis | Oct. 28, 1958 |

FOREIGN PATENTS

| | | |
|---|---|---|
| 1,102,047 | France | Apr. 27, 1955 |
| 1,102,287 | France | May 4, 1955 |